(12) United States Patent
Bantoft et al.

(10) Patent No.: US 9,008,868 B1
(45) Date of Patent: Apr. 14, 2015

(54) CLOUD BASED MANAGEMENT OF AIRCRAFT AVIONICS

(71) Applicant: Satcom Direct, Inc., Satellite Beach, FL (US)

(72) Inventors: Ken Bantoft, Melbourne, FL (US); Curt Allen Gray, Glendale, AZ (US)

(73) Assignee: Satcom Direct, Inc., Satellite Beach, FL (US)

( * ) Notice: Subject to any disclaimer, the term of this patent is extended or adjusted under 35 U.S.C. 154(b) by 0 days.

(21) Appl. No.: 14/297,146

(22) Filed: Jun. 5, 2014

Related U.S. Application Data

(60) Provisional application No. 61/888,574, filed on Oct. 9, 2013.

(51) Int. Cl.
*B64C 19/00* (2006.01)

(52) U.S. Cl.
CPC ........................... *B64C 19/00* (2013.01)

(58) Field of Classification Search
USPC .............................................. 701/3
See application file for complete search history.

(56) References Cited

U.S. PATENT DOCUMENTS

| | | | |
|---|---|---|---|
| 5,493,309 A * | 2/1996 | Bjornholt | 342/455 |
| 5,937,349 A | 8/1999 | Andresen | |
| 5,959,560 A | 9/1999 | Said | |
| 6,014,606 A | 1/2000 | Tu | |
| 6,151,497 A | 11/2000 | Yee | |
| 6,201,797 B1 | 3/2001 | Leuca | |
| 6,741,841 B1 | 5/2004 | Mitchell | |
| 6,781,968 B1 | 8/2004 | Colella | |
| 7,023,365 B1 | 4/2006 | Mitchell | |
| 7,027,898 B1 * | 4/2006 | Leger et al. | 701/14 |
| 7,177,939 B2 * | 2/2007 | Nelson et al. | 709/230 |
| 7,660,579 B2 | 2/2010 | Jensen | |
| 7,761,793 B1 | 7/2010 | Mitchell | |
| 7,852,819 B2 | 12/2010 | Gil | |
| 8,305,936 B2 * | 11/2012 | Wang | 370/254 |
| 8,339,991 B2 | 12/2012 | Biswas | |
| 8,477,771 B2 | 7/2013 | Biswas | |
| 8,527,662 B2 | 9/2013 | Biswas | |
| 2004/0064588 A1 | 4/2004 | Jungck | |
| 2005/0041859 A1 | 2/2005 | Nguyen | |
| 2005/0083358 A1 | 4/2005 | Lapstun | |
| 2005/0215238 A1 | 9/2005 | Macaluso | |
| 2005/0215249 A1 | 9/2005 | Little | |

(Continued)

OTHER PUBLICATIONS

Marpe, et al, A Two-Layered Wavelet-Based Algorithm for Efficient Lossless and Lossy Image Compression, IEEE Transactions on Circuits and Systems for Video Technology, 2000, pp. 1094-1102, vol. 10, No. 7.

(Continued)

*Primary Examiner* — Thomas Tarcza
*Assistant Examiner* — Alex C Dunn
(74) *Attorney, Agent, or Firm* — Brian S. Steinberger; Phyllis K. Wood; Brian S. Steinberger, P.A.

(57) ABSTRACT

Methods, systems and devices for a cloud based management of aircraft avionics allows a service provider, or equipment owner to place a list of tasks to be performed into a centrally managed "Cloud based' system where the tasks are queued to be performed when appropriate. These tasks can be from a predefined list such as but not limited to, uploading configuration data, uploading log and or support data, downloading new configuration data, and the like.

16 Claims, 3 Drawing Sheets

(56) References Cited

U.S. PATENT DOCUMENTS

| | | | |
|---|---|---|---|
| 2005/0244060 A1 | 11/2005 | Nagarajan | |
| 2006/0115164 A1 | 6/2006 | Cooley | |
| 2011/0046842 A1* | 2/2011 | Smith | 701/33 |
| 2012/0083971 A1* | 4/2012 | Preston | 701/36 |
| 2012/0109447 A1* | 5/2012 | Yousefi et al. | 701/32.2 |
| 2013/0158821 A1* | 6/2013 | Ricci | 701/51 |
| 2013/0297103 A1* | 11/2013 | Baker et al. | 701/14 |

OTHER PUBLICATIONS

Linux man page, gzip, gunzip, zcat—compress or expand files, 2002, 7 pages.
Rockwell Collins, EBACE 2012 Press Kit, retrieved on Oct. 4, 2013, retrieved from http://www.rockwellcollins.com/sitecore/content/Data/News/2012_2012_Yr/CS/FY12CSN . . . , 2 pages.
Vandel, et al., Head-Up Guidance System Technology—A Clear Path to Increasing Flight Safety, Flight Safety Foundation, 2009, 29 pages.
Rockwell Collins, Ascent Mobile Applications, 2012, 2 pages.
Rockwell Collins, Falcon Cabin HD, Elevate your flight experience, 2012, 12 pages.
Rockwell Collins, Pro Line Fusion Advanced Avionics, 2011, 8 pages.
Rockwell Collins, Venue High-Definition Cabin Management System, 2012, 12 pages.
Rockwell Collins, Rockwell Collins to provide advanced cabin management and HD entertainment system for Falcon 7X and Falcon 900LX, News Release, 2012, 1 page.
Rockwell Collins, Jet Aviation St. Louis to install Rockwell Collins' Venue HD cabin system on a Global Express, News Release, 2012, 2 pages.
Rockwell Collins, Airshow 4000, retrieved on Oct. 4, 2013, retrieved from http://www.rockwellcollins.com/sirecore/content/Data/Products/Cabin/Moving_Map_syst . . . , 2 pages.
Rockwell Collins, Airshow App for Mobile Devices, 2012, 4 pages.
Rockwell Collins, Airshow 4000 Version 2, 2013, 9 pages.

\* cited by examiner

CLOUD BASED MANAGEMENT OF AIRCRAFT AVIONICS

CROSS REFERENCE TO RELATED APPLICATIONS

This invention claims the benefit of priority to U.S. Provisional Application Ser. 61/888,574 filed Oct. 9, 2013. The entire disclosure of the application listed in this paragraph is incorporated herein by specific reference thereto.

FIELD OF THE INVENTION

This invention relates to aircraft avionics and, in particular, to methods, systems and devices for centrally managed 'Cloud' based system for management of onboard avionics equipment.

BACKGROUND AND PRIOR ART

There are several known patent applications for the use of Cloud based management to consumer products including U.S. Patent Application Publication 2008/0294759 to Biswas et al. This reference describes a hosted network management solution for communications over a computer network supports data communication across a network in accordance with a network message protocol such that communications are established between a network host and a node device. The node device performs a self-configuring operation in which the network host identifies a network owner associated with the hosted network, and maintains a persistent network connection path between the network host and the node device for the exchange of network packet messages. The network host retrieves message data from the network packet messages it receives from the node device and performs network management operations to provide a user management interface to the identified network owner. The hosted network management enables more convenient setup and configuration for the network owner and provides more complete and effective network management tools.

U.S. Patent Application Publication 2008/0285575 to Biswas et al. describes a managed network provides unique network addresses that are assigned to nodes such that no two nodes will have the same address in the managed network and such that each node will always have the same network address regardless of changing its location or changing the network to which it is joined. The nodes, communicating together, comprise a mesh network. Remote management and control of the nodes is possible from the host server, which is located outside of the mesh network, even if a node is located behind a firewall or network address translator (NAT), because server management messages are encapsulated within headers so that a persistent connection between the node and the external host server is maintained once the node sends a message to the host.

The above prior art published patent applications relate specifically to wireless access points, typically with more than one device located in proximity to each other. The systems primarily perform configuration management, and/or status reporting. Another problem is that the prior art systems typically rely on in-band communication—they communicate in real-time over the primary network connection.

To solve the above mentioned problems, what is needed is a system that queues tasks, then executes the queued tasks when the aircraft is not in flight instead of performing real-time communication during the flight.

SUMMARY OF THE INVENTION

A primary objective of the present invention is to provide methods, systems and devices for a central avionic management system such that an avionics device communicates with a centrally located "Cloud" system for command and control of both predefined and arbitrary tasks or functions that the onboard avionics performs.

A first embodiment provides a cloud based aircraft avionic management system can include an aircraft remote management computer, an avionic central system cloud for storing plural queued avionic management and maintenance tasks corresponding to one or more subscribing aircrafts, and an aviation management module onboard each aircraft in communication with onboard avionic equipment boxes and with the aircraft remote management computer forming an aircraft managed network, queued avionic management and maintenance tasks are queued into the aviation management system and the queued tasks are performed when the aircraft in service and not in flight. Each aviation management module is assigned a different network address within the aircraft managed network as a node. Each onboard avionic equipment box associated with the aviation management module node is assigned a different equipment address within the node.

An onboard wireless communication interface is used to communication between the aviation management module onboard the aircraft and the corresponding onboard avionic equipment boxes. The wireless communication interface can be a Wi-Fi communication interface. The queued tasks include uploading configuration data, downloading configuration data, uploading log data, downloading log data, uploading maintenance data, downloading maintenance data, running a scheduled status check, and uploading a software revision and can include scheduled maintenance task and an equipment upgrade task.

A second embodiment provides a method for cloud based management of aircraft avionic devices can include the steps of installing an avionic cloud based management module on plural aircraft, each avionic cloud based management module assigned a different network address as a node within a managed network of aircraft, interfacing the avionic cloud based management module with one or more avionic devices onboard the same aircraft forming a node, queuing tasks related to the onboard avionic devices within the node into a central avionic system cloud, transmitting an aircraft-in-service notice from the aircraft avionic cloud based management module to an aircraft remote management computer, requesting queued tasks corresponding to the aircraft avionic node from the aircraft remote management computer when the aircraft is in-service, and executing the queued tasks when the aircraft is not in-flight and returning a task status to the avionic management system. The method can include assigning a different avionic device address to each avionic device within the mode.

The method can include sending an in-flight notice from the avionic cloud based management module to the aircraft remote management computer when the aircraft is landing, taxiing and being towed.

The method can include queuing one or more tasks when the corresponding aircraft is out-of-service, sending a second in-service notice from the aircraft to the avionic management system after the aircraft lands and is not in-flight, executing the queued tasks and returning a task status to the avionic management system.

The method can include applying an access control to ensure that only an authorized user can queue a task corresponding to one of the onboard avionic devices within the node, scheduling a periodic queued task based on a periodic time interval, and queuing a scheduled software upgrade for one of the aircraft avionic devices.

The method can include, during onboard avionic system power-up, while the aircraft is on the ground and not in-flight, the onboard avionic cloud based management module establishing communication with the aircraft remote management computer to send the aircraft-in-service notice and to request the queued tasks corresponding to the aircraft avionic node.

Further objects and advantages of this invention will be apparent from the following detailed description of preferred embodiments which are illustrated schematically in the accompanying drawings.

DESCRIPTION OF THE PREFERRED EMBODIMENTS

Figure 1:
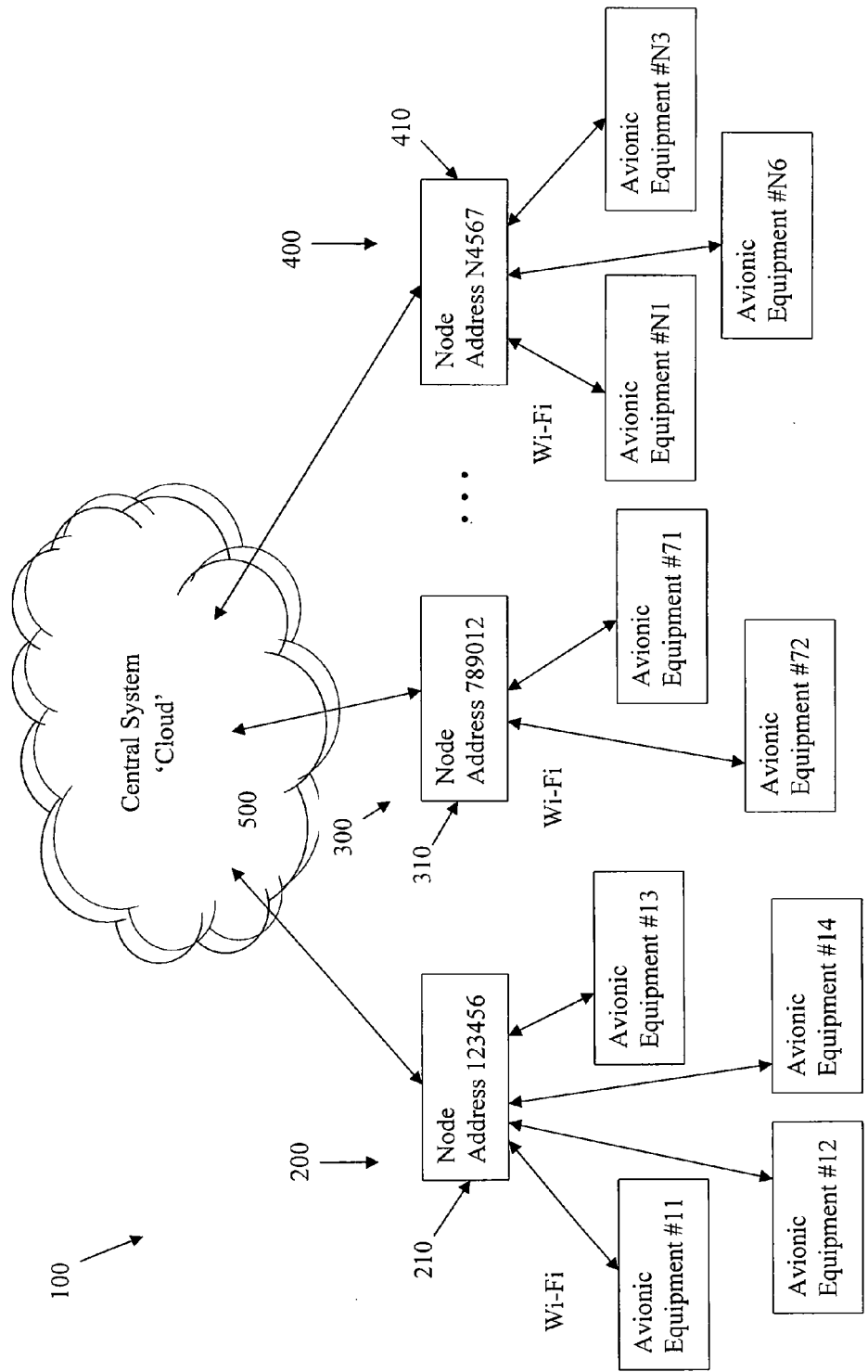
FIG. 1 is a block diagram showing an example of a cloud based aircraft avionic management network.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
100 Cloud based management system
200 aircraft
210 cloud based management' module
300 aircraft
310 cloud based management' module
400 aircraft
410 cloud based management' module
412 aircraft aviation boxes
500 Central system cloud
600 Internet The present invention relates to a system and method for establishing an avionic network management solution on an aircraft. More specifically, the present invention relates to a centrally located "cloud" based management for aircraft avionic boxes for command and control of both predefined and arbitrary tasks or functions that the onboard avionics can perform when the aircraft is not in-flight.

The centrally located "cloud" based management for aircraft avionic boxes can be integrated with various products described in U.S. patent applications, each assigned to Satcom Direct, Inc. the same assignee as this patent application, which are all incorporated by reference in their entirety, and are described below.

U.S. patent application Ser. No. 14/259,796 filed on Apr. 23, 2014, by the same inventor and assignee of the subject invention, which is incorporated by reference in its' entirety, describes system and method for mobile ground-to-air and air-to-ground communication network acceleration. The system and method can reduce the cost of airborne communication services by creating a faster connection and thus increasing data throughput. In one embodiment, the communication network acceleration system and method provide as much as a four-fold increase over standard high-speed data rates. This increase is made possible in part through the integration, implementation, and use of acceleration and compression technologies in the onboard system and ground system that supports communications to and from an airborne terminal.

U.S. Provisional Patent Application No. 61/888,593 filed Oct. 9, 2013, by the same inventor and assignee of the subject invention, which is incorporated by reference in its' entirety, describes methods and systems that can manage multiple different connection types for Air-to-Ground and Ground-to-Air communications. This system actively monitors the different connections types, and switches traffic to the highest priority functioning connection. Furthermore, it does this while maintaining the connections of Internet TCP/IP traffic that is passing through the system, allowing passenger or system traffic to remain connected.

U.S. Provisional Patent Application No. 61/888,600 filed Oct. 9, 2013, by the same inventor and assignee of the subject invention, which is incorporated by reference in its' entirety, describes a capability which requires aircraft passengers who wish to use Internet Access while onboard on aircraft to watch a mandatory safety briefing video prior to being granted Internet access. During the use of personal electronics devices PED onboard an aircraft, the PEDS connect to an onboard wireless access point (Wi-Fi). Either through onboard avionics equipment or through a centrally managed ground based infrastructure, the passenger is required to watch a safety briefing video, with or without additional commercial or educations messages, before the PED is allowed access to the Internet. This is similar to many 'Wi-Fi Hotspots' whereby the owner/operations of such require the viewing of advertisement or other communication content prior to being granted Internet access.

U.S. application Ser. No. 14/259,588 filed on Apr. 23, 2014, by the same inventor and assignee of the subject invention, which is incorporated by reference in its' entirety, describes a satellite-ready Satcom Direct router with simultaneous use of Instmarsat, SwiftBroadband, Swift 64, Ku-Band and Ka-Band satellite connections with intelligent traffic control, along with Wi-Fi access and 3G/4G cellular network connectivity. The router is compatible with existing Wi-Fi access points and is backward-compatible with 802.11b/g. Up to four or more simultaneous wireless networks can be supported, allowing multiple systems to operate on aircraft without additional wireless access points and providing 3G/4G network connectivity when the aircraft is on the ground. A downloadable Satcom Direct router mobile App provides on-board cabin services including one or more of moving maps, flight tracker and command and control of satellite links.

FIG. 1 is a block diagram showing the 'cloud' based management system for multiple aircraft. Each avionic 'cloud based management' module is assigned a unique network address such that no two devices have the same address in the managed network and each piece of avionic equipment associated with a specific cloud based management module is assigned a unique address within the managed network of the cloud based management module "node' as shown in FIG. 1. In the example shown, the managed network 100 includes three separate 'cloud' based management modules 210, 310 and 410 each corresponding to a different aircraft 200, 300 and 400, respectively. Each cloud based management module communicates with avionic boxes onboard the corresponding aircraft. For example, the cloud based management module node can manage multiple avionic boxes such as a communication data accelerator device or a Satcom Direct Router.

Figure 3:
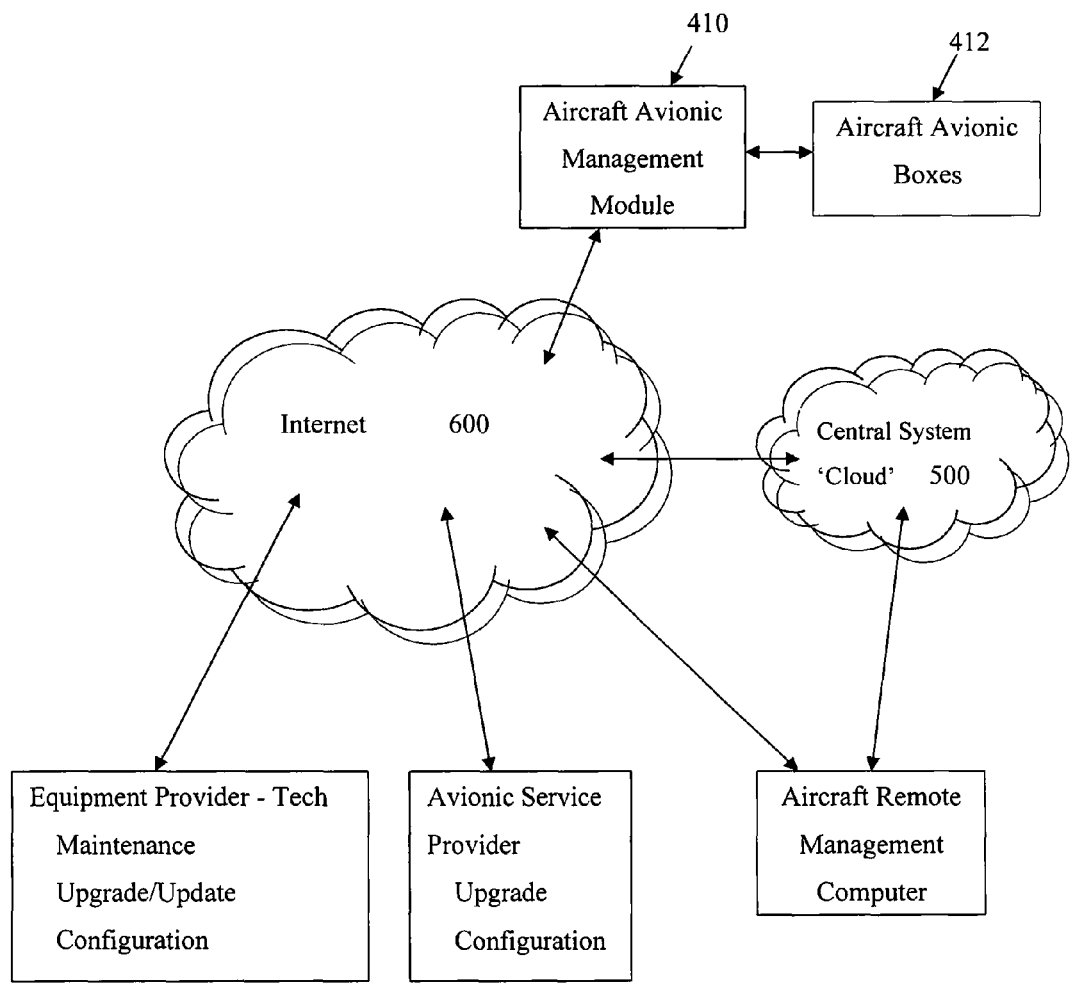
FIG. 3 is a block diagram of cloud based aircraft avionic management system.

Referring to FIG. 1 and FIG. 3, a technician servicing an aircraft requires a copy of the current systems configuration from the avionics equipment 412 installed on Node N4567 (410) corresponding to the aircraft to be serviced. The request is submitted to the Central System Cloud (500) via an interne 600 via a cellular or Wi-Fi connection, where the request is queued. When Aircraft N4567 (400) is powered up the next day, the equipments cloud based management module 410 connects to the Internet 600 via a cellular or Wi-Fi connection and retrieves the queued tasks list. The cloud based management system then executes the task (to get the current system configuration in this example), and sends the configuration data back to the Central System 'Cloud' 500, which then notifies the technician of the availability of the requested data.

Figure 2:
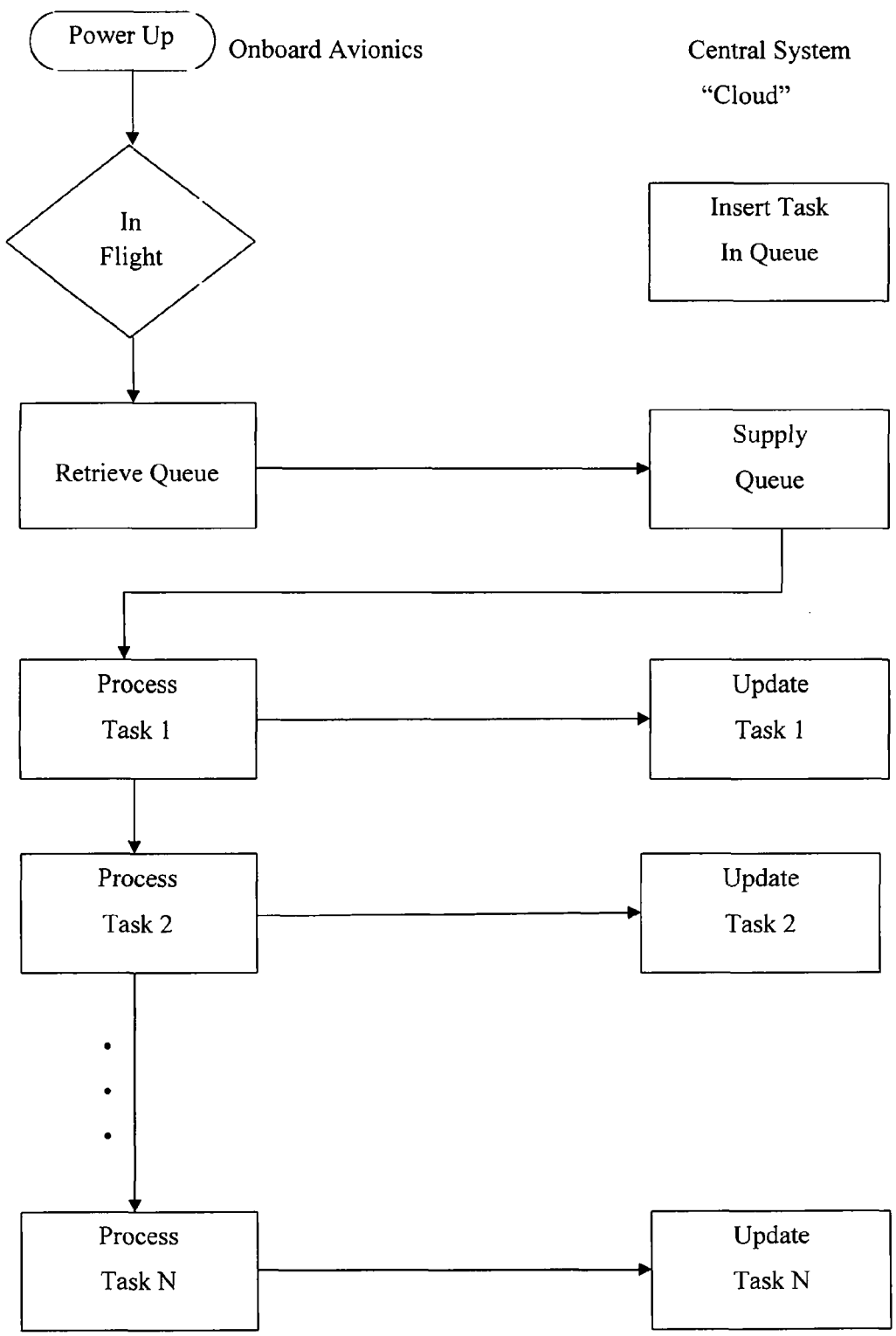
FIG. 2 is a process flow diagram showing the step involved in the cloud based aircraft avionic management system.

FIG. 2 is a flow diagram showing steps for 'in flight' communication between the aircraft 'cloud' based management module (left column) and the central system cloud (right column). As shown, the "cloud" management system is configured to communicate with the avionic boxes on the aircraft during the flight to create a network centric aircraft queue of tasks that are to be executed only when the aircraft is not in flight. The avionic boxes can, for example communicate over a wireless network communication protocol specification, such as the Satcom Direct router (SDR) Wi-Fi access points as described in co-pending U.S. patent application Ser. No. 14/259,588 filed on Apr. 23, 2014, which is incorporated herein by reference hereto.

FIG. 3 is a block diagram of the cloud based management system. Referring to FIG. 2 in conjunction with FIG. 3, the cloud based management of aircraft avionics allows a service provider or equipment provider to place a list of tasks to be performed into a centrally managed 'Cloud based' system where the tasks are queued as shown in FIG. 2 to be performed when appropriate, such as when the aircraft is not in flight. These tasks can be from a predefined list such as but not limited to, uploading configuration data, uploading log and or support data, downloading new configuration data, and the like. The queued tasks can also be arbitrary commands such as updating subsystem software package XYZ to version 1.03, and the like.

The cloud based management of aircraft avionics includes an access control that is applied to ensure only authorized users can place tasks into a queue for a specific avionic box to perform one or more tasks at a scheduled time or scheduled time interval. For example, an avionic box may require routine status checks to determine if the installed software is the latest revision. The equipment provider may have a predetermined schedule for upgrades and the upgrade tasks can be queued into the 'cloud' based avionic equipment management system shown in FIG. 2. When the aircraft is not in-service, the tasks remain queued awaiting the aircraft's return to service. An aircraft is considered to be in-flight during towing, taxiing and landing as well as during actual flight.

During onboard avionics system power up, while the aircraft is on the ground and not in-flight, the onboard avionics system communicates with the centrally hosted avionic management system to send an 'aircraft in-service' notice and to retrieve a list of queued tasks as shown in FIG. 2. The tasks are retrieved and processed. After each task has been completed, the avionic box reports the status of the task to the 'cloud' based management modules and the central system 'cloud'. When the onboard avionics system is in flight, and during transitions to a not in flight state (landing, taxiing or towing) the onboard avionics system repeats the above process of queuing tasks to be performed when he aircraft returns to a not in-flight status.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A cloud based aircraft avionic management system comprising:
    an aircraft remote management computer;
    an avionic central system cloud for storing plural queued avionic management and maintenance tasks corresponding to one or more subscribing aircrafts; and
    an aviation management module onboard each aircraft in communication with onboard avionic equipment boxes and with the aircraft remote management computer forming an aircraft managed network, queued avionic management and maintenance tasks are queued into the aviation management system and the queued tasks are performed when the aircraft in service and not in flight.

2. The system of claim 1 wherein each aviation management module is assigned a different network address within the aircraft managed network as a node.

3. The system of claim 2 wherein each onboard avionic equipment box associated with the aviation management module node is assigned a different equipment address within the node.

4. The system of claim 1 further comprising:
    a wireless communication interface between the aviation management module onboard the aircraft and the corresponding onboard avionic equipment boxes.

5. The system of claim 1 wherein the wireless communication interface comprises:
    a Wi-Fi communication interface between the aviation management module onboard the aircraft and the corresponding onboard avionic equipment boxes.

6. The system of claim 1 wherein the queued tasks include uploading configuration data, downloading configuration data, uploading log data, downloading log data, uploading maintenance data, downloading maintenance data, running a scheduled status check, and uploading a software revision.

7. The system of claim 1 wherein the plural queued tasks include scheduled maintenance task and an equipment upgrade task.

8. A method for cloud based management of aircraft avionic devices comprising the steps of:

installing an avionic cloud based management module on plural aircraft, each avionic cloud based management module assigned a different network address as a node within a managed network of aircraft;

interfacing the avionic cloud based management module with one or more avionic devices onboard the same aircraft forming a node;

queuing tasks related to the onboard avionic devices within the node into a central avionic system cloud;

transmitting an aircraft-in-service notice from the aircraft avionic cloud based management module to an aircraft remote management computer;

requesting queued tasks corresponding to the aircraft avionic node from the aircraft remote management computer when the aircraft is in-service; and executing the queued tasks when the aircraft is not in-flight and returning a task status to the avionic management system.

9. The method of claim 8 further comprising the step of:
assigning a different avionic device address to each avionic device within the mode.

10. The method of claim 8 further comprising the step of:
sending an in-flight notice from the avionic cloud based management module to the aircraft remote management computer when the aircraft is landing, taxiing and being towed.

11. The method of claim 8 further comprising the step of:
queuing one or more tasks when the corresponding aircraft is out-of-service.

12. The method of claim 8 further comprising the step of:
sending a second in-service notice from the aircraft to the avionic management system after the aircraft lands and is not in-flight; and
performing the queued tasks and returning a task status to the avionic management system.

13. The method of claim 8 further comprising the step of:
applying an access control to ensure that only an authorized users can queue a task corresponding to one of the onboard avionic devices within the node.

14. The method of claim 8 further comprising the step of:
scheduling a periodic queued task based on a periodic time interval.

15. The method of claim 8 further comprising the step of:
queuing a scheduled software upgrade for one of the aircraft avionic devices.

16. The method of claim 8 further comprising the step of:
during onboard avionic system power-up, while the aircraft is on the ground and not in-flight, the onboard avionic cloud based management module establishing communication with the aircraft remote management computer to send the aircraft-in-service notice and to request the queued tasks corresponding to the aircraft avionic node.

\* \* \* \* \*